United States Patent
Wang et al.

(10) Patent No.: US 11,974,214 B2
(45) Date of Patent: Apr. 30, 2024

(54) COMMUNICATION NETWORK SEARCH METHOD AND APPARATUS

(71) Applicant: HUAWEI TECHNOLOGIES CO., LTD., Guangdong (CN)

(72) Inventors: Bin Wang, Hangzhou (CN); Yunfei Qiao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 17/542,067

(22) Filed: Dec. 3, 2021

(65) Prior Publication Data
US 2022/0110049 A1 Apr. 7, 2022

Related U.S. Application Data

(63) Continuation of application No. PCT/CN2020/093213, filed on May 29, 2020.

(30) Foreign Application Priority Data

Jun. 6, 2019 (CN) .......................... 201910500658.1

(51) Int. Cl.
*H04W 4/02* (2018.01)
*H04W 48/16* (2009.01)
(52) U.S. Cl.
CPC ........... *H04W 48/16* (2013.01); *H04W 4/027* (2013.01)
(58) Field of Classification Search
None
See application file for complete search history.

(56) References Cited

U.S. PATENT DOCUMENTS 6,985,731 B1 1/2006 Johnson et al.
7,305,238 B2 * 12/2007 Gabara ................. H04W 36/32
455/442

(Continued)

FOREIGN PATENT DOCUMENTS

CN  101442786 A  5/2009
CN  103648148 A  3/2014

(Continued)

OTHER PUBLICATIONS

China Telecom et al., "On Conditional Handover for NR," 3GPP TSG RAN WG3 #104, R3-192513, Reno, Nevada, USA, May 12-17, 2019, 4 pages.

(Continued)

*Primary Examiner* — Kenneth B Wells
(74) *Attorney, Agent, or Firm* — Fish & Richardson P.C.

(57) ABSTRACT

A communication network search method and an apparatus are disclosed. The method can include a terminal device sending a first message to a network device, where the first message includes a communication network type of the terminal device and first location information that is used during the sending of the first message. The terminal device receives a second message sent by the network device, where the second message includes N cell identifiers that are used to mark N pre-selected cells, which are determined by the network device based on the first location information and the communication network type. The terminal device determines M target cells in the N pre-selected cells based on second location information and motion status information that are used during the receiving of the second message. The terminal device searches for the M target cells.

15 Claims, 5 Drawing Sheets

(56) References Cited

U.S. PATENT DOCUMENTS

| | | | | |
|---|---|---|---|---|
| 8,812,019 | B2* | 8/2014 | Moeglein | H04W 4/029 |
| | | | | 455/456.3 |
| 9,986,483 | B1 | 5/2018 | Balmakhtar et al. | |
| 2016/0021561 | A1 | 1/2016 | Wang et al. | |

FOREIGN PATENT DOCUMENTS

| | | |
|---|---|---|
| CN | 106028279 A | 10/2016 |
| CN | 106304270 A | 1/2017 |
| CN | 106879037 A | 6/2017 |
| CN | 107241783 A | 10/2017 |
| CN | 108235408 A | 6/2018 |
| CN | 108289316 A | 7/2018 |
| EP | 2840836 A1 | 2/2015 |
| WO | 2018201399 A1 | 11/2018 |

OTHER PUBLICATIONS

Extended European Search Report issued in European Application No. 20819556.0 on Jun. 3, 2022, 10 pages.

InterDigital Inc., "Conditional Mobility for Non-Terrestrial Networks," 3GPP RAN WG2 Meeting #106, R2-1907840, Reno, United States, May 13-17, 2019, 5 pages.

Polaris Wireless, SiRF, Telecommunications Systems (TCS), "Addition of Wireless Location Signatures positioning method to the UTRAN," 3GPP TSG-RAN2 Meeting #56, Tdoc R2-070079, Riga, Latvia, Nov. 6-10, 2006, 8 pages.

Office Action issued in Chinese Application No. 201910500658.1 on Mar. 25, 2021, 16 pages (with English translation).

Office Action issued in Chinese Application No. 201910500658.1 on Aug. 31, 2021, 14 pages (with English translation).

PCT International Search Report and Written Opinion issued in International Application No. PCT/CN2020/093213 on Aug. 27, 2020, 13 pages (with English translation).

\* cited by examiner

COMMUNICATION NETWORK SEARCH METHOD AND APPARATUS

CROSS-REFERENCE TO RELATED APPLICATION

This application is a continuation of International Application No. PCT/CN2020/093213, filed on May 29, 2020, which claims priority to Chinese Patent Application No. 201910500658.1, filed on Jun. 6, 2019. The disclosures of the aforementioned applications are hereby incorporated by reference in their entireties.

TECHNICAL FIELD

This application relates to the field of communication technologies, and in particular, to a communication network search method and an apparatus.

BACKGROUND

With continuous development of science and technologies, a wireless communication technology has evolved from a first generation wireless communication system based on a model communication technology to a fourth generation wireless communication system based on a long term evolution (LTE) technology. While the fourth generation wireless communication system has been widely commercially used in the world and achieved great success, research work of a fifth generation wireless communication system is also in full swing. With update and iteration of the wireless communication system, communication services supported by the wireless communication system have evolved from voice and an SMS to high-speed data communication services such as real-time videos. In addition, due to rapid growth of a quantity of wireless connections and emergence of new wireless service types such as the internet of things and virtual reality, a requirement on the fifth generation wireless communication system becomes increasingly high.

To provide wider wireless network coverage to improve a communication service in a coverage area, such as an offshore area or a remote area, having no mobile network (which is also referred to as a cellular network below), satellites and non-terrestrial mobile communication networks (NTN) are important complements to the cellular network, and the satellites and the non-terrestrial mobile communication networks are also more widely applied. With an increasing degree of integration between the NTN and the cellular network, how to ensure that a user terminal can efficiently access a wide area communication service network including the NTN and the cellular network becomes one of hotspots under current research. In a conventional technology, for a user terminal whose relative location is fixed, generally, it may be determined, based on location information of the user terminal, whether the user terminal can access a cellular cell and/or a satellite cell. However, for a user terminal whose relative location is not fixed, for example, a user terminal in a high-speed moving state, an efficient and fast communication network search and access method is not provided in the conventional technology. This reduces user experience of the user terminal.

SUMMARY

Embodiments of this application provide a communication network search method and an apparatus, to improve communication network search and access efficiency, and improve user experience of a terminal device.

According to a first aspect, an embodiment of this application provides a communication network search method. A terminal device sends a first message to a network device. Herein, the first message includes a communication network type of the terminal device and first location information that is used during the sending of the first message. The terminal device receives a second message sent by the network device. Herein, the second message includes N cell identifiers, the N cell identifiers are used to mark N pre-selected cells, and the N pre-selected cells are determined by the network device based on the first location information and the communication network type. The terminal device determines M target cells in the N pre-selected cells based on second location information and motion status information that are used during the receiving of the second message. The terminal device searches for the M target cells.

In this embodiment of this application, the terminal device first uploads the first location information and the communication network type to the network device, to obtain the N pre-selected cells that are estimated by the network device and that may be found by the terminal device. Then, the terminal device estimates, with reference to the second location information and the motion status information of the terminal device, a target search area that the terminal device may reach, and further sift the M target cells from the N pre-selected cells by using the target search area. Two cell sifting operations are performed, so that a target cell to be searched for by the terminal device is a cell that can be found and accessed by the terminal device with a high probability. In this way, communication network search and access efficiency of the terminal device can be improved, and user experience of the terminal device can be improved.

With reference to the first aspect, in a feasible implementation, any one of the N pre-selected cells satisfies a pre-selection condition. The pre-selection condition is that the pre-selected cell is included in a pre-selected communication service area and matches the communication network type; or the pre-selection condition is that the pre-selected cell has an overlapping area with the pre-selected communication service area and matches the communication network type. The pre-selected communication service area is determined by the network device based on the first location information and a preset first area size parameter.

With reference to the first aspect, in a feasible implementation, the motion status information used during the receiving of the second message includes a movement speed and a movement direction. The terminal device obtains a preset second area size parameter when the movement speed is greater than a first movement speed threshold. The terminal device divides, based on the second area size parameter, the movement direction, and the second location information that is used during the receiving of the second message, the pre-selected communication service area to obtain a target search area. The terminal device determines the M target cells in the N pre-selected cells based on the target search area. Herein, the target cell is a pre-selected cell included in the target search area, or the target cell is a cell that has an overlapping area with the target search area. The terminal device estimates, by using the location information and the motion status information of the terminal device, an area that the terminal device may reach, determines the area obtained through estimation as the target search area, and then further determines, by using the target search area, a cell that may be found by the terminal device. In this way, when performing cell handover or reselection, the terminal device does not need to search for some cells whose distances are relatively far or whose signals are relatively poor, so that power consumption and time costs of communication network search and access are reduced, the communication network search and access efficiency can be improved, and the user experience of the terminal device is improved.

With reference to the first aspect, in a feasible implementation, the terminal device determines, based on the movement speed, a search periodicity corresponding to the M target cells. The terminal device searches for the M target cells based on the search periodicity. Herein, when the movement speed is greater than or equal to a second movement speed threshold, the search periodicity corresponding to the M target cells is a first periodicity; or when the movement speed is less than the second movement speed threshold, the search periodicity corresponding to the M target cells is a second periodicity; and the first periodicity is less than the second periodicity. A length of the periodicity for searching for the target cell by the terminal device is determined by using the movement speed of the terminal device, so that a terminal device that moves at a faster speed can perform cell search by using a smaller periodicity, and a case in which a terminal device that moves at a relatively fast speed cannot find some target cells due to an excessively long search periodicity is avoided. Therefore, communication network search effectiveness of the terminal device can be further improved, and the communication network search efficiency can be improved.

With reference to the first aspect, in a feasible implementation, the communication network type is a cellular network and/or a satellite and non-terrestrial communication network.

According to a second aspect, an embodiment of this application provides a communication network search method. The method includes: A network device receives a first message sent by a terminal device. Herein, the first message includes a communication network type of the terminal device and first location information that is used during the sending of the first message. The network device determines N pre-selected cells based on the first location information and the communication network type, and sends, to the terminal device, a second message including identification information of the N pre-selected cells. Herein, the identification information of the N pre-selected cells is used to determine, with reference to second location information and motion status information that are used during receiving of the second message by the terminal device, M target cells that are to be searched for.

In this embodiment of this application, the network device estimates, based on the first location information uploaded by the terminal device, the N pre-selected cells that may be found by the terminal device, and notifies the terminal device of the N pre-selected cells, so that the terminal device can subsequently further sift, by using the second location information and the motion status information of the terminal device, the M target cells that can be found and accessed by the terminal device with a high probability from the N pre-selected cells. In this way, communication network search and access efficiency of the terminal device can be improved, and user experience of the terminal device can be improved.

With reference to the second aspect, in a feasible implementation, any one of the N pre-selected cells is a cell that overlaps a pre-selected communication service area and matches the communication network type, and the pre-selected communication service area is determined by the network device based on the first location information and a preset first area size parameter.

With reference to the second aspect, in a feasible implementation, the communication network type is a cellular network and/or a satellite and non-terrestrial communication network.

According to a third aspect, an embodiment of this application provides a terminal device. The terminal device includes a unit configured to perform the communication network search method according to any possible implementation of the first aspect. Therefore, beneficial effects (or advantages) of the communication network search method according to the first aspect can also be implemented.

According to a fourth aspect, an embodiment of this application provides a network device. The network device includes a unit configured to perform the communication network search method according to any possible implementation of the second aspect. Therefore, beneficial effects (or advantages) of the communication network search method according to the second aspect can also be implemented.

According to a fifth aspect, an embodiment of this application provides a terminal device. The terminal device includes a processor, a memory, and a transceiver. The processor, the memory, and the transceiver are connected to each other. The memory is configured to store a computer program, the computer program includes program instructions, and the processor is configured to invoke the program instructions to perform the communication network search method according to the first aspect. Therefore, beneficial effects of the communication network search method according to the first aspect can also be implemented.

According to a sixth aspect, an embodiment of this application provides a network device. The network device includes a processor, a memory, and a transceiver. The processor, the memory, and the transceiver are connected to each other. The memory is configured to store a computer program, the computer program includes program instructions, and the processor is configured to invoke the program instructions to perform the communication network search method according to the second aspect. Therefore, beneficial effects of the communication network search method according to the second aspect can also be implemented.

According to a seventh aspect, an embodiment of this application provides a computer-readable storage medium. The computer-readable storage medium stores instructions. When the instructions are run on a computer, the computer is enabled to perform the communication network search method according to any possible implementation of the first aspect. Therefore, beneficial effects of the communication network search method according to the first aspect can also be implemented.

According to an eighth aspect, an embodiment of this application provides a computer-readable storage medium. The computer-readable storage medium stores instructions. When the instructions are run on a computer, the computer is enabled to perform the communication network search method according to any possible implementation of the second aspect. Therefore, beneficial effects of the communication network search method according to the second aspect can also be implemented.

According to a ninth aspect, an embodiment of this application provides a chip system. The chip system includes a processor, configured to support a terminal device in implementing a function in the first aspect, for example, generating or processing information in the communication network search method according to the first aspect. In a possible design, the chip system further includes a memory, and the memory is configured to store program instructions and data that are necessary for the terminal. The chip system may include a chip, or may include the chip and another discrete component.

According to a tenth aspect, an embodiment of this application provides a chip system. The chip system includes a processor, configured to support a terminal device in implementing a function in the second aspect, for example, generating or processing information in the communication network search method according to the second aspect. In a possible design, the chip system further includes a memory, and the memory is configured to store program instructions and data that are necessary for the terminal. The chip system may include a chip, or may include the chip and another discrete component.

According to an eleventh aspect, an embodiment of this application provides a computer program product including instructions. When the computer program product runs on a computer, the computer is enabled to perform the communication network search method according to the first aspect. Therefore, beneficial effects of the communication network search method according to the first aspect can also be implemented.

According to a twelfth aspect, an embodiment of this application provides a computer program product including instructions. When the computer program product runs on a computer, the computer is enabled to perform the communication network search method according to the second aspect. Therefore, beneficial effects of the communication network search method according to the second aspect can also be implemented.

According to the embodiments of this application, the communication network search and access efficiency of the terminal device can be improved, and the user experience of the terminal device can be improved.

DESCRIPTION OF EMBODIMENTS

The following clearly and completely describes the technical solutions in the embodiments of this application with reference to the accompanying drawings in the embodiments of this application.

A communication network system to which a communication network search method provided in the embodiments of this application is applicable may be a terrestrial communication system, such as a 4G communication system, a 5G communication system (which is also referred to as a new radio NR system), or a future communication system; or may be a satellite and non-terrestrial communication system including a low-orbit satellite communication system, a medium-orbit satellite communication system, or a high-orbit satellite communication system; or may be a wide area communication service system including the terrestrial communication system and the satellite and non-terrestrial communication system. This is not limited herein. Herein, it may be understood that the terrestrial communication systems may alternatively be other wireless communication systems using various radio access technologies, for example, systems using access technologies such as code division multiple access (CDMA), frequency division multiple access (FDMA), time division multiple access (TDMA), orthogonal frequency division multiple access (OFDMA), single-carrier frequency division multiple access (SC-FDMA), and multiple-input multiple-output (MIMO).

A terminal device in this application may be a wireless device that provides a user with voice and/or data connectivity. The wireless device may be a handheld device having a wireless connection function, or another processing device connected to a wireless modem, or a mobile terminal that communicates with one or more core networks by using a radio access network. For example, the wireless terminal may be a mobile phone, a computer, a tablet computer, a personal digital assistant (PDA), a mobile internet device (MID), a wearable device, an e-book reader (e-book reader), or the like. For another example, the wireless device may alternatively be a portable, pocket-sized, handheld, computer built-in, or in-vehicle mobile device. For still another example, the wireless device may alternatively be a mobile station or an access point. For ease of description, the terminal device is used as an example for description in the embodiments of this application. A network device in the embodiments of this application is an apparatus that is deployed in a radio access network (RAN) and that is configured to provide a wireless communication function for the terminal device. In a terrestrial communication system, the network device may include a macro base station, a micro base station, a relay station, an access point base station controller, a transmission reception point (TRP), and the like in various forms. In a satellite and non-terrestrial communication system, the network devices mainly refer to various forms of earth stations and/or communication satellites. It should be explained that, when a communication satellite in a satellite and non-terrestrial communication system is used to relay only a communication signal, a network device in the system mainly refers to a terrestrial earth station, and the earth station may include a macro base station, a micro base station, a relay station, an access point base station controller, a transmission reception point (TRP), and the like in various forms. When a communication satellite in a satellite and non-terrestrial communication system is used for operation coordination and information processing of the communication system, a network device in the system mainly refers to a communication satellite.

In this application, the terms "include" and "have" respectively indicate "include at least" and "have at least". For example, if A includes B, A may include only B, or may include another item in addition to B. A meaning of the term "have" is similar to that of the term "include", and is not limited herein. In this application, the term "according to" indicates "according to at least", and the term "based on" indicates "based on at least". For example, if A determines C according to B, A may determine C according to only B, or may determine C according to both B and another item. A meaning of the term "based on" is similar to that of the term "according to", and is not limited herein.

Figure 1:
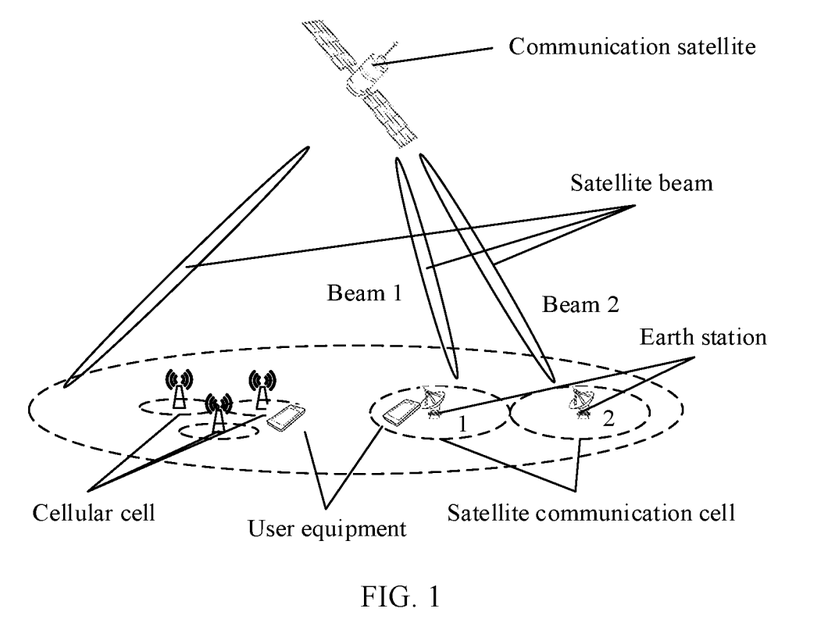
FIG. 1 is a schematic diagram of a structure of a communication system according to an embodiment of this application.

FIG. 1 is a schematic diagram of a structure of a communication system according to an embodiment of this application. It can be learned from FIG. 1 that the system is a wide area communication service system including a terrestrial communication system and a satellite and non-terrestrial communication system. In the wide area communication service system, a communication satellite transmits beams to the ground at different angles, and one beam corresponds to one satellite cell. (For example, in FIG. 1, a beam 1 corresponds to a satellite cell 1, and a beam 2 corresponds to a satellite cell 2). Satellite cells corresponding to all the beams transmitted by the communication satellite form a satellite communication network service area corresponding to the communication satellite. A terminal device in the satellite communication network service area may establish a connection to a satellite communication service network by using an earth station in the area. In addition, the satellite communication network service area may further include one or more cellular cells, and the cellular cells form a cellular network service area. A terminal device in the cellular network service area preferentially selects to access a cellular network, and accesses the satellite communication network only when the terminal device finds that signal quality of the cellular network is relatively poor. Certainly, it may be understood that the satellite communication service area and the cellular network service area may not overlap. This is not limited herein. In the embodiments of this application, the wide area communication service system in FIG. 1 is used as an example to specifically describe the provided communication network search method.

A technical problem to be resolved by using the communication network search method provided in this application is how to enable a terminal device in a moving state to quickly find an accessible communication cell, to improve communication network search and access efficiency of the terminal device, and improve user experience of the terminal device.

Figure 2:
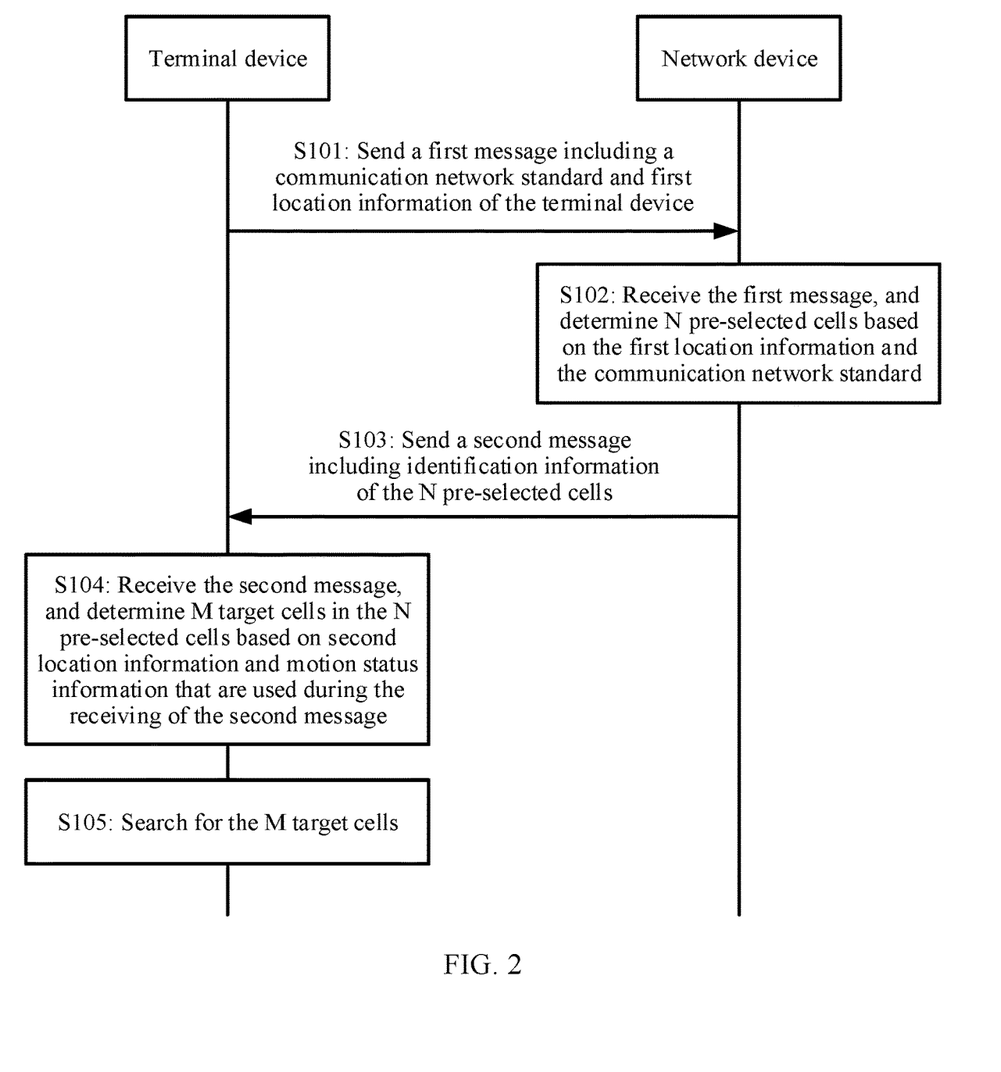
FIG. 2 is a schematic flowchart of a communication network search method according to an embodiment of this application.

FIG. 2 is a schematic flowchart of a communication network search method according to an embodiment of this application. It should be noted herein that all terminal devices in the embodiments of this application are terminal devices that are in a connected state and have a specific movement speed. A terminal device that is in an idle state or has no network service can use the communication network search method according to this embodiment of this application only after the terminal device is switched to the connected state. It can be learned from FIG. 2 that the method includes the following steps.

S101: A terminal device sends a first message including a communication network type and first location information of the terminal device.

In some feasible implementations, the terminal device may first obtain the communication network type applicable to the terminal device and location information of the terminal device at a current moment (which is referred to as the first location information below for ease of distinction), then pack the communication network type and the first location information into a message (which is referred to as the first message below for ease of distinction), and send the first message to a network device.

In a specific implementation, the terminal device may first extract device configuration information of the terminal device, and determine, in the device configuration information, the communication network type applicable to the terminal device. Herein, the communication network type applicable to the terminal device may include the foregoing terrestrial communication network and/or the foregoing satellite and non-terrestrial communication network. The terrestrial communication network may specifically include a 4G cellular network, a 5G cellular network, and the like. This is not limited herein. The following uses a cellular network as an example, that is, uses the cellular network to replace the terrestrial communication network for description. The satellite and non-terrestrial communication network may specifically include a satellite communication service network, an unmanned aerial vehicle communication service network, and the like. This is not limited herein. The following uses a satellite communication service network as an example, that is, uses the satellite communication service network to replace the satellite and non-terrestrial communication network for description. Then, the terminal device may further determine the first location information of the terminal device at the current moment by using a global positioning system (GPS) technology, a base station positioning technology, or the like. Herein, the first location information may be specifically a latitude and longitude of the terminal device at the current moment, or may be a name of a geographical location at which the terminal device is located at the current moment, for example, xx village or xx street. This is not limited herein. Finally, the terminal device may pack the communication network type and the first location information into the first message according to a communication protocol corresponding to the communication network type, and send the first message to the network device by using a communication network accessed by the terminal device.

In a feasible implementation, when determining that a preset message sending periodicity arrives, the terminal device may start to obtain the communication network type and the first location information of the terminal device, and then send the first message including the communication network type and the first location information to the network device. Herein, the message sending periodicity may be specifically an empirical value obtained through statistics collection by performing a plurality of experiments for the communication network search method provided in this application. In addition, after obtaining the communication network type of the terminal device for the first time, the terminal device may store the communication network type. When needing to obtain the communication network type of the terminal device again (for example, when the message sending periodicity arrives again), the terminal device may directly extract the stored communication network type, without reading the device configuration information of the terminal device to obtain the communication network type again. The communication network type and the first location information are periodically obtained, and the first message is sent to the network device, so that the terminal device can feed back a current status of the terminal device to the network device in real time, and subsequently, the network device can always indicate, based on latest status information of the terminal device, the terminal device to perform communication network search.

In another feasible implementation, when detecting that signal quality of a communication cell connected to the terminal device is less than or equal to a preset signal quality threshold (which is referred to as a first signal quality threshold below for ease of distinction), the terminal device may start to obtain the communication network type and the first location information of the terminal device, and send the first message including the communication network type and the first location information to the network device. For example, when detecting that a reference signal received power (RSRP) of a current serving cell is less than −95 dBm, the terminal device may start to obtain the communication network type and the first location information of the terminal device. When detecting that signal quality of the current serving cell is poor, the terminal device starts to send the first message, so that energy consumption and a waste of channel resources that are caused by frequent sending of the first message by the terminal device can be avoided.

In still another feasible implementation, after obtaining the communication network type and the first location information, the terminal device may further determine a movement speed of the terminal device at the current moment (which is referred to as a first movement speed below for ease of distinction), then pack the communication network type, the first location information, and the first movement speed into the first message, and send the first message to the network device. The first movement speed is sent to the network device, so that the network device can subsequently determine, based on the first movement speed, a pre-selected communication service area that is more suitable for the terminal device.

S102: The network device receives the first message, and determines N pre-selected cells based on the communication network type and the first location information.

In some feasible implementations, after receiving the first message sent by the terminal device, the network device may first parse the first message, to obtain the communication network type and the first location information of the terminal device. Then, the terminal device may determine the pre-selected communication service area based on the first location information and a preset area size parameter (which is referred to as a first area size parameter below for ease of distinction), and then determine, based on area information of the pre-selected communication service area and the communication network type, the N pre-selected cells corresponding to the terminal device. Herein, N is a positive integer greater than or equal to 1.

In a specific implementation, after obtaining the first message sent by the terminal device, the network device may parse the first message according to the corresponding communication protocol, to obtain the communication network type and the first location information. Then, the network device may first obtain the preset area size parameter (which is referred to as the first area size parameter below for ease of understanding and distinction). Herein, the first area size parameter may include an area shape identifier (which is referred to as a first area shape identifier below for ease of distinction), a size parameter (which is referred to as a first size parameter below for ease of distinction), and the like. The first area size parameter is used to delimit the pre-selected communication service area with a fixed size around the terminal device with reference to the first location information. Specifically, the first area size parameter may be specifically [i, a, b, . . . ]. i is the first area shape identifier, and different first area shape identifiers correspond to different shapes of the pre-selected communication service area. For example, it is specified that when i is 1, the shape of the pre-selected communication service area is a circle; when i is 2, the shape of the pre-selected communication service area is a rectangle; when i is 3, the shape of the pre-selected communication service area is an ellipse. It may be understood herein that the shape of the pre-selected communication service area may be set based on an actual application scenario. The foregoing descriptions are merely examples, and impose no limitation. In addition, a quantity of first size parameters in the first area size parameter is associated with the shape of the pre-selected communication service area. For example, assuming that the shape of the pre-selected communication service area is a circle, there may be one first size parameter, namely, a radius parameter. If the shape of the pre-selected communication service area is a rectangle, there may be two first size parameters, namely, a length and a width.

Figure 3:
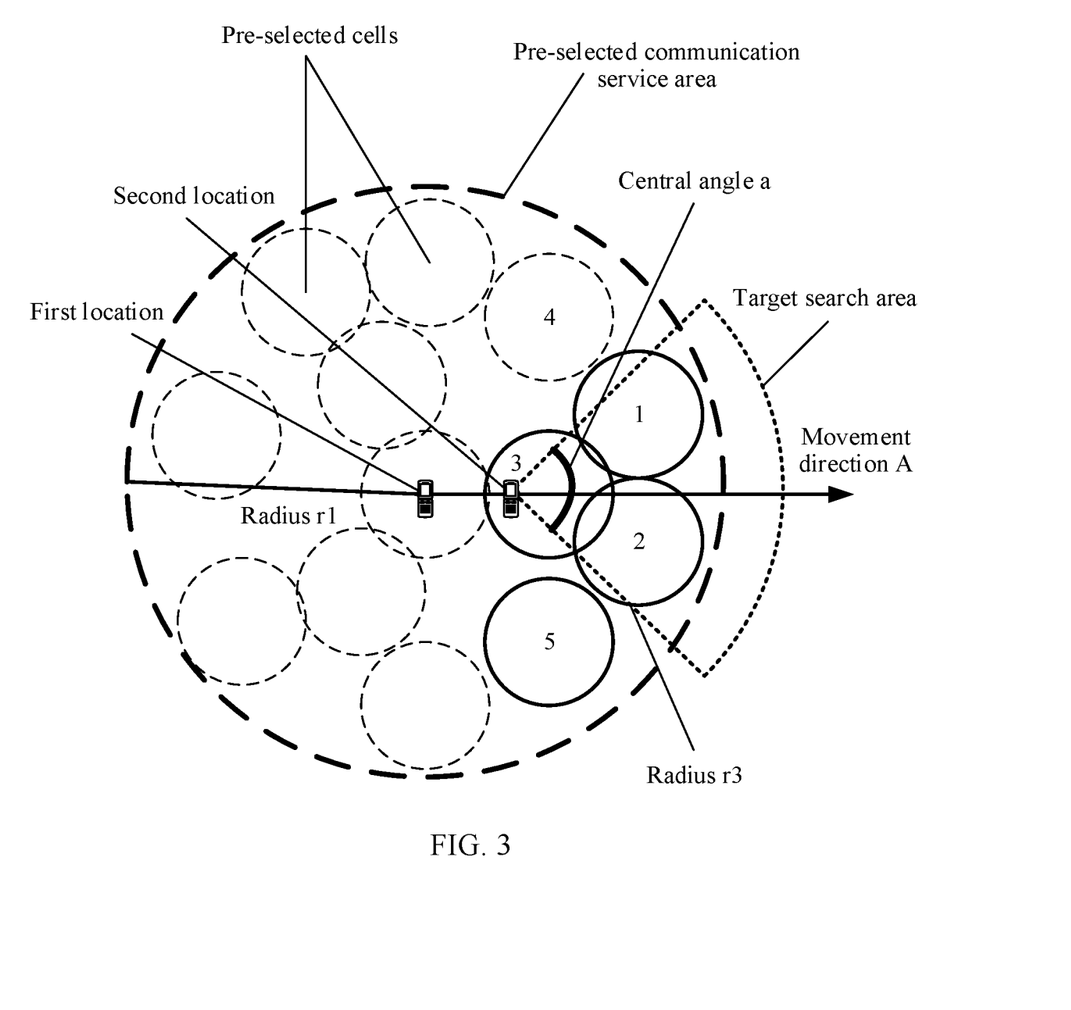
FIG. 3 is a schematic diagram of target cell distribution according to an embodiment of this application.

After obtaining the first area size parameter, the network device may determine the pre-selected communication service area based on the first area size parameter and the first location information. For example, FIG. 3 is a schematic diagram of target cell distribution according to an embodiment of this application. As shown in FIG. 3, when it is determined, based on the first area size parameter, that the pre-selected communication service area is a circle, the network device may use a location (which is referred to as a first location below) indicated by the first location information as a center of the circle, and delimit a circular pre-selected communication service area around the terminal device by using the first size parameter (namely, a radius parameter) R included in the first area size parameter as a radius. For another example, assuming that it is determined, based on the first area size parameter, that the pre-selected communication service area is a rectangle, the network device may use the first location indicated by the first location information as a center of gravity, and delimit a rectangular pre-selected communication service area around the terminal device based on a length and a width that are included in first area size parameter. After determining the pre-selected communication service area, the network device may determine the N pre-selected cells based on the pre-selected communication service area and a preset pre-selection condition.

In a feasible implementation, the pre-selection condition may be that the pre-selected cell is included in the pre-selected communication service area and matches the communication network type. In other words, the network device may first obtain cell distribution information of a current communication service network. Herein, the current communication service network may include both a terrestrial communication network and a satellite and non-terrestrial communication network, to be specific, the network device may first obtain cell information of all working cellular cells in the terrestrial communication network and cell information of all working satellite communication cells in the satellite and non-terrestrial communication network. Then, the network device may determine, based on cell location information of all the cellular cells and cell location information of all the satellite communication cells, a plurality of cellular cells and a plurality of satellite communication cells that are included in the pre-selected communication service area. Finally, the network device may determine, as the pre-selected cells of the terminal device, all cells that are in the plurality of cellular cells and the plurality of satellite communication cells and that comply with the communication network type of the terminal device. For example, it is assumed that there are 10 working network cells that can be learned by the network device, including 10 cellular cells and 10 satellite communication cells. The network device may first obtain cell location information of each of the 10 cellular cells and cell location information of each of the 10 satellite communication cells, and then determine cellular cells and satellite communication cells that are included in the pre-selected communication service area. Herein, it is assumed that five cellular cells and five satellite communication cells are included in the pre-selected communication service area. Then, when the communication network type is a cellular network, the network device may determine the five cellular cells as the pre-selected cells of the terminal device, that is, N is 5. When the communication network type is a satellite communication network, the network device may determine the five satellite communication cells as the pre-selected cells of the terminal device, that is, N is 5. When the communication network type is the cellular network and the satellite communication network, the network device may determine the five cellular cells and the five satellite communication cells as the pre-selected cells of the terminal device, that is, N is 10.

In another feasible implementation, the pre-selection condition may be that the pre-selected cell has an overlapping area with the pre-selected communication service area and matches the communication network type. In other words, the network device may first obtain cell distribution information of a current communication service network. Herein, the current communication service network may include both a terrestrial network and a satellite and non-terrestrial communication network. To be specific, the network device may first obtain cell information of all working cellular cells in the terrestrial communication network and cell information of all working satellite communication cells in the satellite and non-terrestrial communication network. Then, the network device may determine, based on cell location information of all the cellular cells and cell location information of all the satellite communication cells, a plurality of cellular cells and a plurality of satellite communication cells that have overlapping areas with the pre-selected communication service area. Finally, the network device may determine, as the pre-selected cells of the terminal device, all cells that are in the plurality of cellular cells and the plurality of satellite communication cells and that comply with the communication network type of the terminal device. For a specific process, refer to the foregoing process of sifting the pre-selected cells based on the communication network type. Details are not described herein again.

Optionally, when the first message obtained by the network device further includes the first movement speed of the terminal device, after obtaining the first area size parameter, the network device may adjust the first area size parameter based on the first movement speed, and then determine the pre-selected communication service area based on an adjusted first area size parameter and the first location information, so that the pre-selected communication service area determined based on the adjusted first area size parameter is more applicable to the terminal device that moves fast. For example, it is assumed that the first area size parameter indicates that the shape of the pre-selected communication service area is a circle, and a radius is r1. After obtaining the first area size parameter, the network device may input the shape identifier and the radius r1 in the first area size parameter, and the first movement speed into a pre-trained area adjustment model, determine an adjusted circular radius r2 based on output of the area adjustment model, and then determine the circular pre-selected communication service area based on the radius r2 and the first location information. Herein, the area adjustment model is a machine learning model that is in a convergent state and that is obtained by performing training for a plurality of times based on a plurality of movement speeds and a plurality of area size parameter samples.

S103: The network device sends a second message including identification information of the N pre-selected cells.

In some feasible implementations, after obtaining the N pre-selected cells, the network device may extract the cell identification information of each of the N pre-selected cells (for example, a cell ID of each pre-selected cell), then pack the N pieces of cell identification information corresponding to the N pre-selected cells into the second message, and send the second message to the terminal device.

S104: The terminal device receives the second message, and determines M target cells in the N pre-selected cells based on second location information and motion status information that are used during the receiving of the second message.

In some feasible implementations, the terminal device may receive the second message sent by the network device, and parse the second message according to a preset communication protocol, to obtain the cell identification information of the N pre-selected cells. In addition, the terminal device may further obtain the location information (which is referred to as the second location information below for ease of distinction) and the motion status information of the terminal device during the receiving of the second message by the terminal device, and determine information about the M target cells in the N pre-selected cells based on the second location information and the motion status information, where M is less than or equal to N. The motion status information may include a movement speed (which is referred to as a second movement speed below for ease of distinction) and a movement direction of the terminal device during the receiving of the second message by the terminal device.

In a specific implementation, after obtaining the cell identification information of the N pre-selected cells included in the second message, the terminal device may first obtain geographical location information of the terminal device at a current moment (which is referred to as the second location information below for ease of distinction) by using a global positioning system technology or a base station positioning technology. Then, the terminal device may determine the movement speed (which is referred to as the second movement speed below for ease of distinction) and the movement direction of the terminal device at the current moment based on the first location information and the second location information. Specifically, a rectangular coordinate system is established by using the first location as an origin, where an east-to-west direction is a horizontal direction, and a north-to-south direction is a vertical direction. In the rectangular coordinate system, the terminal device may calculate, based on the first location information and the second location information, an included angle between an east direction and a line between the first location and a second location. Herein, assuming that the angle is a degrees, the movement direction of the terminal device at the second location may be described as an a-degree east-to-west offset. It may be understood herein that the foregoing expression manner of the movement direction is merely one expression manner of the movement direction in this embodiment of this application, and there is another feasible expression manner of the movement direction. This is not limited in this embodiment of this application. For ease of understanding, the following uses the foregoing expression manner of the movement direction as an example for description. The terminal device may further estimate, by using the first location information and the second location information, the second movement speed corresponding to the moment when the terminal is at the second location. Specifically, the terminal device may calculate a distance D between the first location and the second location by using the first location information and the second location information, then obtain a difference dt between a moment t2 when the terminal device is at the first location and a moment t3 when the terminal is at the second location, and finally calculates an average movement speed D/dt during moving of the terminal device from the first location to the second location as the second movement speed of the terminal device at the second location.

After the terminal device obtains the second location information, the second movement speed, and the movement direction (which is referred to as a movement direction A below for ease of distinction), the terminal device may first extract a preset first movement speed threshold, and determine whether the second movement speed is greater than or equal to the first movement speed threshold. If determining that the second movement speed is less than the first movement speed threshold, the terminal device may return to perform the operation described in step S101. If the terminal device determines that the second movement speed is greater than or equal to the first movement speed threshold, the terminal device may extract a preset second area size parameter. Herein, the second area size parameter is mainly used to determine, with reference to the second location information and the movement direction A, a target search area corresponding to the terminal device. The second area size parameter may include an area shape (or the area shape identifier described above) and a size parameter (which is referred to as second size parameter below for ease of distinction). For example, the second area size parameter may be specifically [sector, radius r3, central angle b]. It should be noted herein that the second area shape may be specifically a sector, a rectangle, or the like. This is not limited herein. Similarly, the second size parameter also changes with the second area shape. For example, assuming that the second area shape is a sector, the second size parameter may include a radius and a central angle. Assuming that the second area shape is a rectangle, the second size parameter may include a length and a width. Then, the terminal device may determine the target search area based on the second location information, the movement direction A, and the second area size parameter. For example, the terminal device may delimit a sector-shaped area by using the second location indicated by the second location information as a circle center and using the movement direction A as a central axis direction, and with reference to the radius and the central angle included in the second size parameter, and use the sector-shaped area as the target search area corresponding to the terminal device. Alternatively, the terminal device may delimit a rectangular area by using the second location indicated by the second location information as a center of gravity and using the movement direction A as a horizontal axis direction, and with reference to the length and the width included in the second size parameter, and use the rectangular area as the target search area corresponding to the terminal device.

After determining the target search area, the terminal device may obtain cell location information of each of the N pre-selected cells. Herein, the terminal device may initiate a cell location information obtaining request to the network device, to obtain the cell location information of each pre-selected cell by using the network device. Then, the terminal device may determine, based on the cell location information of each pre-selected cell, pre-selected cells that are included in the target search area, and determine M pre-selected cells included in the target search area as M target areas corresponding to the terminal device, where M is a positive integer less than or equal to N. Optionally, after obtaining the cell location information of each of the N pre-selected cells, the terminal device may further determine, based on the cell location information of the pre-selected cell, pre-selected cells that have overlapping areas with the target search area, and determine M pre-selected cells that have overlapping areas with the target search area as the M target cells corresponding to the terminal device.

In this embodiment, the terminal device estimates, by using the location information and the motion status information of the terminal, an area that the terminal device may reach, determines the area obtained through estimation as the target search area, and then further determines, by using the target search area, a cell that may be found by the terminal device. In this way, when performing cell handover or reselection, the terminal device does not need to search for some cells whose distances are relatively far or whose signals are relatively poor, so that power consumption and time costs of communication network search and access are reduced, the communication network search and access efficiency can be improved, and user experience of the terminal device is improved.

The following describes, by using an example, a process in which the terminal device determines the M target cells with reference to FIG. 3. After receiving the cell identification information corresponding to the N pre-selected cells, the terminal device may obtain the second location information (indicating the second location), the second movement speed, and the movement direction A that correspond to the N pre-selected cells. For a specific process, refer to the foregoing descriptions. Next, the terminal device may obtain the preset second area size parameter. For example, the parameter is specifically [sector, r3, a]. Then, the terminal device delimits a sector-shaped area with a central angle a by using the second location as a circle center, using r3 as a radius, and using the movement direction A as a central axis direction, and determines the sector-shaped area as the target search area. Then, the terminal device may obtain the cell location information of the pre-selected cells by using the network device, and determine, by using the cell location information of the pre-selected cells, pre-selected cells that are in the N pre-selected cells and that have overlapping areas with the target search area. As shown in FIG. 3, a pre-selected cell 1, a pre-selected cell 2, and a pre-selected cell 3 have overlapping areas with the target search area, and other pre-selected cells such as a pre-selected cell 4 and a pre-selected cell 5 do not have overlapping areas with the target search area. Therefore, the terminal device may determine the three pre-selected cells, namely, the pre-selected cell 1, the pre-selected cell 2, and the pre-selected cell 3 as three target cells of the terminal device.

S105: The terminal device searches for the M target cells.

In some feasible implementations, after determining the M target cells, the terminal device may perform cell search on each of the M target cells.

Optionally, in a specific implementation, after determining the M target cells, the terminal device may obtain a preset search periodicity, and periodically search for the M target cells based on the search periodicity. In this way, a waste of communication resources caused by frequent cell search by the terminal device can be avoided. Further, the preset search periodicity may include a first periodicity and a second periodicity. The first periodicity is less than the second periodicity. After determining the M target cells, the terminal device may determine whether the second movement speed is greater than or equal to a preset second movement speed threshold. Here, the second movement speed threshold is greater than the first movement speed threshold. The second movement speed threshold may be specifically an empirical value obtained through statistics collection by performing a plurality of experiments for the communication network search method provided in this application. If the terminal device determines that the second movement speed is greater than or equal to the second movement speed threshold, the terminal device may determine that the first periodicity is the search periodicity. If the terminal device determines that the second movement speed is less than the second movement speed threshold, the terminal device may determine that the second periodicity is the search periodicity. A length of the periodicity for searching for the target cell by the terminal device is determined by using the movement speed of the terminal device, so that a terminal device that moves at a faster speed can perform cell search by using a smaller periodicity, and a case in which a terminal device that moves at a relatively fast speed cannot find some target cells due to an excessively long search periodicity is avoided. Therefore, communication network search effectiveness of the terminal device can be further improved, and the communication network search efficiency can be improved.

Further, in a feasible implementation, when the terminal device finds one or more of the target cells and determines that a communication network environment of the terminal device satisfies a preset network handover condition, the terminal device may select a target cell having best signal quality from the one or more target cells, and is handed over from a communication network of a current serving cell of the terminal device to a communication network of the target cell. Herein, the network handover condition may be that a signal quality parameter value of the current serving cell of the terminal device is less than a preset signal quality parameter threshold; or may be that a difference between the signal quality parameter value of the current serving cell of the terminal device and a signal quality parameter value of the target cell found by the terminal device may be greater than or equal to a preset signal quality parameter difference. This is not specifically limited herein.

Further, in another feasible implementation, after the terminal device finds one or more of the target cells, the terminal device may select a target cell having best signal quality from the one or more target cells, and the terminal device initiates, when establishing a connection to a current serving cell of the terminal device, an access request to the target cell having the best signal quality, that is, the terminal device starts establishing dual-connection communication.

In this embodiment of this application, the network device first estimates, based on the first location information uploaded by the terminal device, the N pre-selected cells that may be found by the terminal device, and notifies the terminal device of the N pre-selected cells. After receiving the information about the N pre-selected cells, the terminal device estimates, by using the second location information and the motion status information of the terminal device, the target search area that the terminal device may reach, and further sift the M target cells from the N pre-selected cells by using the target search area. Then, terminal device performs cell search on the M target cells. Two cell sifting operations are completed by the network device and the terminal device, so that a cell to be searched for by the terminal device is a cell that can be found by the terminal device with a high probability. In this way, the communication network search and access efficiency of the terminal device can be improved, and the user experience of the terminal device can be improved.

Figure 4:
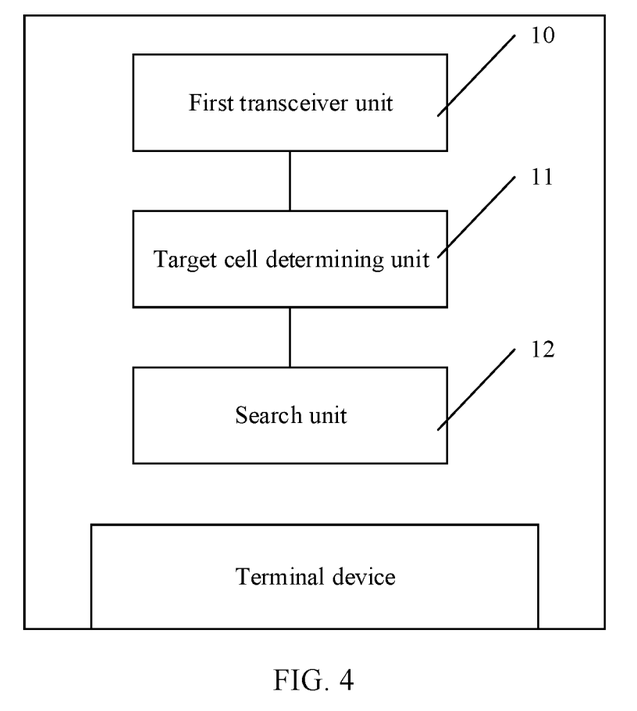
FIG. 4 is a schematic diagram of a structure of a terminal device according to an embodiment of this application.

FIG. 4 is a schematic diagram of a structure of a terminal device according to an embodiment of this application. The terminal device includes:

a first transceiver unit 10, configured to send a first message to a network device, where the first message herein includes a communication network type of the terminal device and first location information that is used during the sending of the first message, where the first transceiver unit 10 is further configured to receive a second message sent by the network device, where the second message herein includes N cell identifiers, the N cell identifiers are used to mark N pre-selected cells, and the N pre-selected cells are determined by the network device based on the first location information and the communication network type in the first message sent by the first transceiver unit 10;

a target cell determining unit 11, configured to determine M target cells in the N pre-selected cells based on second location information and motion status information that are used during the receiving of the second message by the first transceiver unit 10; and a search unit 12, configured to search for the M target cells determined by the target cell determining unit.

In a feasible implementation, any one of the N pre-selected cells satisfies a pre-selection condition. The pre-selection condition is that the pre-selected cell is included in a pre-selected communication service area and matches the communication network type; or the pre-selection condition is that the pre-selected cell has an overlapping area with the pre-selected communication service area and matches the communication network type. The pre-selected communication service area is determined by the network device based on the first location information and a preset first area size parameter.

In a feasible implementation, the motion status information used during the receiving of the second message includes a movement speed and a movement direction. The target cell determining unit 11 is configured to: obtain a preset second area size parameter when the movement speed is greater than a first movement speed threshold; divide, based on the second area size parameter, the movement direction, and the second location information that is used during the receiving of the second message by the first transceiver unit 10, the pre-selected communication service area to obtain a target search area; and determine the M target cells in the N pre-selected cells based on the target search area, where the target cell is a pre-selected cell included in the target search area, or the target cell is a cell that has an overlapping area with the target search area.

In a feasible implementation, the search unit 12 is configured to:

determine, based on the movement speed, a search periodicity corresponding to the M target cells; and search for the M target cells based on the search periodicity, where when the movement speed is greater than or equal to a second movement speed threshold, the search periodicity corresponding to the M target cells is a first periodicity; or when the movement speed is less than the second movement speed threshold, the search periodicity corresponding to the M target cells is a second periodicity; and the first periodicity is less than the second periodicity.

In a feasible implementation, the communication network type is a cellular network and/or a satellite and non-terrestrial communication network.

In a feasible implementation, the first transceiver unit 10 may first obtain the communication network type corresponding to the terminal device and the first location information at a current moment, pack the communication network type and the first location information into the first message, and send the first message to the network device. For a specific process, refer to the process of determining and sending the first message in step S101 in Embodiment 1. Details are not described herein again. Then, the first transceiver unit 10 may receive the second message that is sent by the network device and that includes the cell identifiers of the N pre-selected cells. For a specific process, refer to the process of receiving the second message in step S104 in Embodiment 1. Details are not described herein again. Then, the target cell determining unit 11 may determine the M target cells in the N pre-selected cells based on the second location information and the motion status information that are used during the receiving of the second message by the first transceiver unit 10. For a specific process, refer to the target cell determining process in step S104 in Embodiment 1. Details are not described herein again. Finally, the search unit 12 may search for the M target cells. For a specific process, refer to the target cell searching process in step S105 in Embodiment 1. Details are not described herein again.

Figure 5:
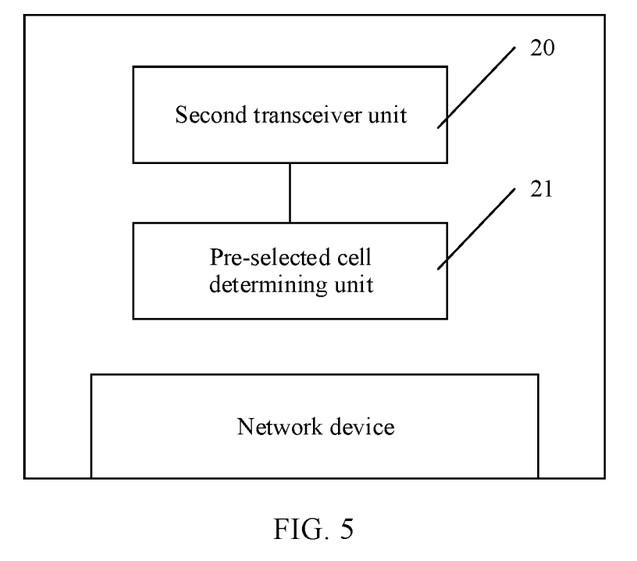
FIG. 5 is a schematic diagram of a structure of a network device according to an embodiment of this application.

FIG. 5 is a schematic diagram of a structure of a network device according to an embodiment of this application. It can be learned from FIG. 5 that the network device includes:

a second transceiver unit 20, configured to receive a first message sent by a terminal device, where the first message herein includes a communication network type of the terminal device and first location information that is used during the sending of the first message; and a pre-selected cell determining unit 21, configured to determine N pre-selected cells based on the first location information and the communication network type that are received by the second transceiver unit 20, where the second transceiver unit 20 is further configured to send, to the terminal device, a second message including identification information of the N pre-selected cells that are determined by the pre-selected cell determining unit, where the identification information of the N pre-selected cells herein is used to determine, with reference to second location information and motion status information that are used during receiving of the second message by the terminal device, M target cells that are to be searched for.

In a possible implementation, any one of the N pre-selected cells satisfies a pre-selection condition, the pre-selection condition is that the pre-selected cell is included in a pre-selected communication service area and matches the communication network type; or the pre-selection condition is that the pre-selected cell has an overlapping area with the pre-selected communication service area and matches the communication network type, and the pre-selected communication service area is determined by the network device based on the first location information and a preset first area size parameter.

In a feasible implementation, the communication network type is a cellular network and/or a satellite and non-terrestrial communication network.

In a feasible implementation, the second transceiver unit 20 may receive the first message that is sent by the terminal device and that includes the communication network type of the terminal device and the first location information that is used during the sending of the first message. For a specific process, refer to the process of receiving the first message in step S102 in Embodiment 1. Details are not described herein again. Then, the pre-selected cell determining unit 21 may determine the N pre-selected cells based on the first location information and the communication network type that are received by the second transceiver unit 20. For a specific process, refer to the process of determining the N pre-selected cells based on the first location information and the communication network type in step S102 in Embodiment 1. Details are not described herein again. Finally, the second transceiver unit 20 may send, to the terminal device, the second message including the identification information of the N pre-selected cells that are determined by the pre-selected cell determining unit. For a specific process, refer to the process of sending the second message to the terminal device in step S103 in Embodiment 1. Details are not described herein again.

Figure 6:
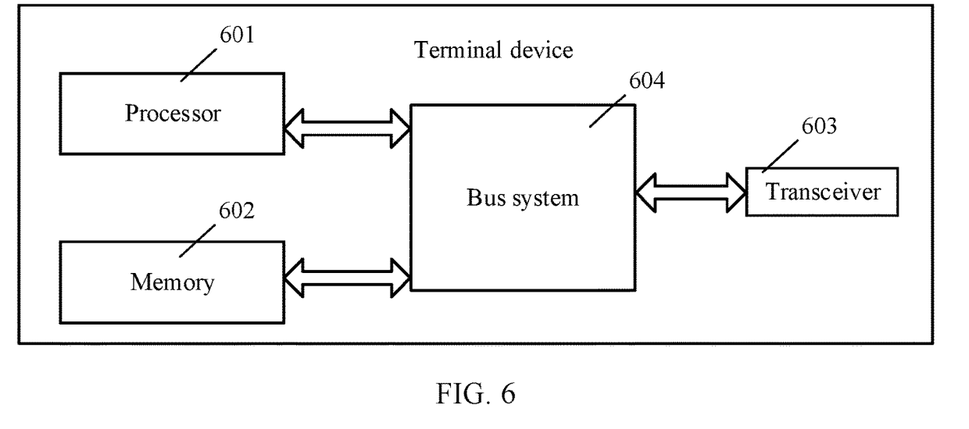
FIG. 6 is another schematic diagram of a structure of a terminal device according to an embodiment of this application.

FIG. 6 is another schematic diagram of a structure of a terminal device according to an embodiment of this application. The terminal device includes:

a processor 601, a memory 602, and a transceiver 603. Optionally, the processor 601, the memory 602, and the transceiver 603 may be connected by using a bus system 604.

The memory 602 includes but is not limited to a RAM, a ROM, an EPROM, or a CD-ROM. The memory 602 is configured to store related instructions and data. The memory 602 stores the following elements: an executable module or a data structure, a subset thereof, or an extended set thereof:

operation instructions: including various operation instructions and used to implement various operations; and an operating system: including various system programs and used to implement various basic services and process hardware-based tasks.

Only one memory is shown in FIG. 6. Certainly, a plurality of memories may alternatively be disposed as required.

The transceiver 603 may be a communication module or a transceiver circuit, and is configured to transmit information such as data or signaling between a server and a playback device. In this embodiment of this application, the transceiver 603 is configured to perform operations such as sending the first message and receiving the second message in Embodiment 1.

The processor 601 may be a controller, a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in the embodiments of this application. Alternatively, the processor 601 may be a combination of processors implementing a computing function, for example, a combination of one or more microprocessors, or a combination of a DSP and a microprocessor.

In a specific application, components of the terminal device are coupled together by using the bus system 604. In addition to a data bus, the bus system 604 may further include a power bus, a control bus, a status signal bus, and the like. However, for clear description, various buses are marked as the bus system 604 in FIG. 6. For ease of illustration, FIG. 6 merely shows an example of the bus system 604.

The communication network search method that is implemented by the terminal device and that is disclosed in the embodiments of this application may be applied to the processor 601, or implemented by the processor 601. The processor 601 may be an integrated circuit chip and has a signal processing capability.

Figure 7:
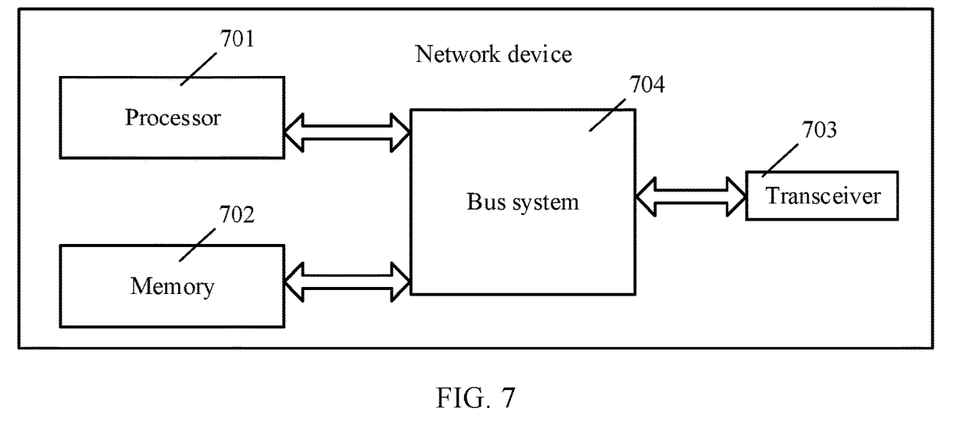
FIG. 7 is another schematic diagram of a structure of a network device according to an embodiment of this application.

FIG. 7 is another schematic diagram of a structure of a network device according to an embodiment of this application. The network device is specifically a playback device, and includes:

a processor 701, a memory 702, and a transceiver 703. Optionally, the processor 701, the memory 702, and the transceiver 703 may be connected by using a bus system 704.

The memory 702 includes but is not limited to a RAM, a ROM, an EPROM, or a CD-ROM. The memory 702 is configured to store related instructions and data. The memory 702 stores the following elements: an executable module or a data structure, a subset thereof, or an extended set thereof:

operation instructions: including various operation instructions and used to implement various operations; and an operating system: including various system programs and used to implement various basic services and process hardware-based tasks.

Only one memory is shown in FIG. 7. Certainly, a plurality of memories may alternatively be disposed as required.

The transceiver 703 may be a communication module or a transceiver circuit, and is configured to transmit information such as data or signaling between a server and a playback device. In this embodiment of this application, the transceiver 703 is configured to perform operations such as receiving the first message and sending the second message in Embodiment 1.

The processor 701 may be a controller, a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in the embodiments of this application. Alternatively, the processor 701 may be a combination of processors implementing a computing function, for example, a combination of one or more microprocessors, or a combination of a DSP and a microprocessor.

In a specific application, components of the network device are coupled together by using the bus system 704. In addition to a data bus, the bus system 704 may further include a power bus, a control bus, a status signal bus, and the like. However, for clear description, various buses are marked as the bus system 704 in FIG. 7. For ease of illustration, FIG. 7 merely shows an example of the bus system 704.

The communication network search method that is implemented by the network device and that is disclosed in the embodiments of this application may be applied to the processor 701, or implemented by the processor 701. The processor 701 may be an integrated circuit chip and has a signal processing capability.

A person of ordinary skill in the art may understand that all or some of the procedures of the methods in the embodiments may be implemented by a computer program instructing related hardware. The program may be stored in a computer-readable storage medium. When the program is executed, the procedures of the foregoing method embodiments are performed. The foregoing storage medium includes: any medium that can store program code, such as a ROM, a random access memory RAM, a magnetic disk, or an optical disc.

What is claimed is:

1. A communication network search method, comprising:

sending, by a terminal device, a first message to a network device, wherein the first message comprises a communication network type applicable to the terminal device and first location information, wherein the first location information includes location information of the terminal device when the terminal device sends the first message;

receiving, by the terminal device, a second message sent by the network device, wherein the second message comprises N cell identifiers that are used to mark N pre-selected cells, wherein the N pre-selected cells are determined based on the first location information and the communication network type;

determining, by the terminal device, M target cells in the N pre-selected cells based on second location information and motion status information, wherein the second location information includes location information of the terminal device when the terminal device receives the second message, and the motion status information includes motion information of the terminal device when the terminal device receives the second message; and searching, by the terminal device, for the M target cells.

2. The method according to claim 1, wherein any one of the N pre-selected cells satisfies a pre-selection condition, and wherein the pre-selection condition comprises:

a pre-selected cell being included in a pre-selected communication service area and matching the communication network type; or the pre-selected cell having an overlapping area with the pre-selected communication service area and matching the communication network type, wherein the pre-selected communication service area is determined by the network device based on the first location information and a preset first area size parameter.

3. The method according to claim 2, wherein the motion status information comprises a movement speed and a movement direction, and wherein determining, by the terminal device, the M target cells in the N pre-selected cells based on the second location information and the motion status information comprises:

obtaining, by the terminal device, a preset second area size parameter in response to the movement speed being greater than a first movement speed threshold;

dividing, by the terminal device based on the preset second area size parameter, the movement direction, and the second location information, the pre-selected communication service area to obtain a target search area; and determining, by the terminal device, the M target cells in the N pre-selected cells based on the target search area, wherein a target cell in the M target cells is a pre-selected cell included in the target search area, or the target cell is a cell that has an overlapping area with the target search area.

4. The method according to claim 3, wherein searching, by the terminal device, for the M target cells comprises:

determining, by the terminal device based on the movement speed, a search periodicity corresponding to the M target cells; and searching, by the terminal device, for the M target cells based on the search periodicity, wherein:

when the movement speed is greater than or equal to a second movement speed threshold, the search periodicity corresponding to the M target cells is a first periodicity, when the movement speed is less than the second movement speed threshold, the search periodicity corresponding to the M target cells is a second periodicity, and the first periodicity is less than the second periodicity.

5. The method according to claim 1, wherein the communication network type is at least one of a cellular network or a satellite and non-terrestrial communication network.

6. The method according to claim 1, wherein the motion status information includes a movement speed of the terminal device when the terminal device receives the second message.

7. The method according to claim 1, wherein the motion status information includes a movement direction of the terminal device when the terminal device receives the second message.

8. A communication network search method, comprising:
receiving, by a network device, a first message sent by a terminal device, wherein the first message comprises a communication network type applicable to the terminal device and first location information, wherein the first location information includes location information of the terminal device when the terminal device sends the first message; and determining, by the network device, N pre-selected cells based on the first location information and the communication network type; and sending, to the terminal device, a second message comprising identification information of the N pre-selected cells, wherein the identification information of the N pre-selected cells is used to determine, with reference to second location information and motion status information by the terminal device, M target cells that are to be searched for, wherein the second location information includes location information of the terminal device when the terminal device receives the second message, and the motion status information includes motion information of the terminal device when the terminal device receives the second message.

9. The method according to claim 8, wherein any one of the N pre-selected cells is a cell that overlaps a pre-selected communication service area and matches the communication network type, and wherein the pre-selected communication service area is determined by the network device based on the first location information and a preset first area size parameter.

10. The method according to claim 8, wherein the communication network type is at least one of a cellular network or a satellite and non-terrestrial communication network.

11. A terminal device, comprising:
at least one processor;
one or more memories coupled to the at least one processor and storing programming instructions for execution by the at least one processor to:
send a first message to a network device, wherein the first message comprises a communication network type applicable to the terminal device and first location information, wherein the first location information includes location information of the terminal device when the terminal device sends the first message;
receive a second message sent by the network device, wherein the second message comprises N cell identifiers that are used to mark N pre-selected cells, wherein the N pre-selected cells are determined by the network device based on the first location information and the communication network type;
determine M target cells in the N pre-selected cells based on second location information and motion status information, wherein the second location information includes location information of the terminal device when the terminal device receives the second message, and the motion status information includes motion information of the terminal device when the terminal device receives the second message; and
search for the M target cells.

12. The terminal device according to claim 11, wherein any one of the N pre-selected cells satisfies a pre-selection condition, and wherein the pre-selection condition comprises:
a pre-selected cell being included in a pre-selected communication service area and matching the communication network type; or
the pre-selected cell having an overlapping area with the pre-selected communication service area and matching the communication network type, wherein the pre-selected communication service area is determined by the network device based on the first location information and a preset first area size parameter.

13. The terminal device according to claim 12, wherein the motion status information comprises a movement speed and a movement direction, and wherein the one or more memories store the programming instructions for execution by the at least one processor to:
obtain a preset second area size parameter in response to the movement speed being greater than a first movement speed threshold;
divide, based on the preset second area size parameter, the movement direction, and the second location information, the pre-selected communication service area to obtain a target search area; and
determine the M target cells in the N pre-selected cells based on the target search area, wherein a target cell in the M target cells is a pre-selected cell included in the target search area, or the target cell is a cell that has an overlapping area with the target search area.

14. The terminal device according to claim 13, wherein the one or more memories store the programming instructions for execution by the at least one processor to:
determine, based on the movement speed, a search periodicity corresponding to the M target cells; and
search for the M target cells based on the search periodicity, wherein:
when the movement speed is greater than or equal to a second movement speed threshold, the search periodicity corresponding to the M target cells is a first periodicity,
when the movement speed is less than the second movement speed threshold, the search periodicity corresponding to the M target cells is a second periodicity, and
the first periodicity is less than the second periodicity.

15. The terminal device according to claim 11, wherein the communication network type is at least one of a cellular network or a satellite and non-terrestrial communication network.

* * * * *